A. B. RICHARDSON.
METHOD OF PREPARING HAMS.
No. 175,757. Patented April 4, 1876.
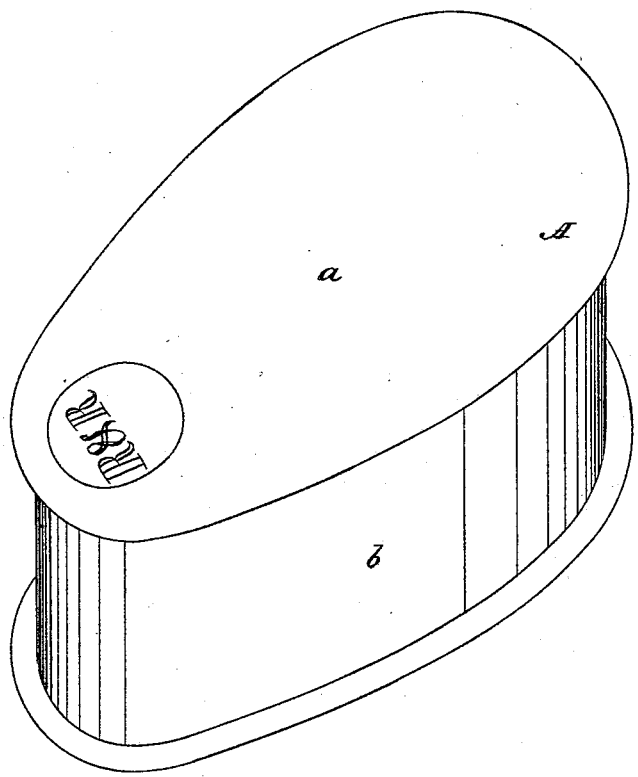

UNITED STATES PATENT OFFICE.

ALDEN B. RICHARDSON, OF DOVER, DELAWARE, ASSIGNOR TO HIMSELF AND JAMES W. ROBBINS, OF SAME PLACE.

IMPROVEMENT IN METHODS OF PREPARING HAMS.

Specification forming part of Letters Patent No. 175,757, dated April 4, 1876; application filed March 3, 1876.

*To all whom it may concern:*

Be it known that I, ALDEN B. RICHARDSON, of Dover, in the county of Kent and State of Delaware, have invented a new and useful Improvement in the Preparation of Hams; and I do hereby declare that the following is a full, clear, and exact description of the same, reference being had to the accompanying drawing.

My invention relates to an improved method of preparing hams for the market; and it consists in first withdrawing the bone from the ham, and then packing the ham into a specially-constructed can, after which it is hermetically sealed, and then cooked until it is sufficiently done to be ready for the table. The ham is thus cooked with all of its natural juices and flavors preserved, and in consequence of the packing and cooking, the space left after the bone is withdrawn is perfectly closed, making the ham solid and homogeneous all through, so that the whole ham may be sliced through and through, and with the exception of a slight seam, bears no evidence of the former existence of a bone.

In the drawing, the figure represents one of my hams as it appears when prepared and ready for the market.

The ham, as thus shown, is contained in a specially-devised can, A, which is made of tin or other sheet metal, and of a size slightly smaller than the ham to be packed, so that the compression incident to the packing will tend, during the subsequent operation of cooking, to fill up the bone cavity. These cans are made with two sides, *a*, which in shape are oblong and wider at one end than the other, so as to correspond to the shape of the ham. The edges of the can are made of the continuous strip *b*, which connect the sides *a*, and which edges are straight in transverse direction.

In preparing the ham, the bone is first skillfully cut around by means of a long knife, and then withdrawn. The ham is then packed closely in one of the cans, which have one of the sides *a* loose. The side is then soldered on and the ham then cooked until it is ready for the table, after which it will keep perfectly sweet and possessed of all of its delicate flavors until it is open to be used, and for a week afterward. Generally the ham will be cooked done at once; but as it may, in some instances, be desirable to only partially cook the same at first and afterward cook it done when it is used, I do not propose to limit myself in this respect, and may modify the cooking operation as described.

Hams prepared in this way are not only sweeter and more tender, but they present a better appearance in carving, and, as there is no bone to which the meat can adhere, there is an economy in the consumption of the same.

I am aware of the fact that it is not new to preserve meat by grinding or cutting up the same, and cooking them after being sealed, but it is obvious that ham cut to pieces in this way would lose its prestige, and, to a great extent, its flavor as ham. I do not claim, furthermore, the removal of the bone from the ham alone. Hams could not be made to be either presentable, marketable, or as sweet by simply being boned and cooked, for the reason that the bone cavity would not become closed, the ham would become too dry, numerous filaments of meat would fall off during the operation, and while the ham would become misshapen, it would also lose a large portion of its juices and flavors.

Having thus disclaimed the cooking of cut meats in hermetically-sealed cans, and the operation of boning the ham, I would have it understood, further, that I do not claim the putting up of hams in tin cans corresponding in shape to the ham, as this is shown in Patent No. 112,467. None of these methods produce the article of merchandize which is the result of my invention—*i. e.*, a whole, boneless, solid ham, produced by packing a boneless ham into a hermetically-sealed can of slightly smaller size, and cooking the same so as to close the bone cavity. My invention, it will be seen, is not open to any of the objections incident to the above methods, taken singly, and I am enabled to supply the market with hams whole, boneless, but without a bone cavity, unusually sweet and juicy, well preserved in hermetically-sealed cans, and already cooked for the table.

Having thus described my invention, what I claim as new is—

1. The herein-described method of preparing hams, by removing the bone, packing the boned ham into a tightly-fitting hermetically-sealed can, and cooking the same, whereby the bone-cavity is closed and the ham rendered solid, substantially as described.

2. As a new article of merchandise, a whole, boneless, solid ham, put up in a specially-constructed hermetically-sealed can, as described.

The above specification of my invention signed by me this 23d day of February, 1876.

ALDEN B. RICHARDSON.

Witnesses:
  EDWD. W. BYRN,
  CHAS. A. PETTIT.